United States Patent
Bacher et al.

(10) Patent No.: US 7,235,301 B2
(45) Date of Patent: Jun. 26, 2007

(54) LATENT HEAT STORAGE MATERIAL, LATENT HEAT STORAGE UNIT CONTAINING THE MATERIAL, PROCESSES FOR PRODUCING THE MATERIAL AND THE UNIT AND PROCESSES FOR USING THE MATERIAL

(75) Inventors: Jürgen Bacher, Wertingen (DE); Oswin Öttinger, Meitingen (DE); Martin Christ, Wehringen (DE)

(73) Assignee: SGL Carbon AG, Wiesbaden (DE)

( * ) Notice: Subject to any disclaimer, the term of this patent is extended or adjusted under 35 U.S.C. 154(b) by 0 days.

(21) Appl. No.: 11/127,819

(22) Filed: May 12, 2005

(65) Prior Publication Data

US 2005/0258394 A1    Nov. 24, 2005

(30) Foreign Application Priority Data

May 18, 2004  (EP) ................................. 04011756

(51) Int. Cl.
*B32B 9/00* (2006.01)
(52) U.S. Cl. ..................................... 428/408
(58) Field of Classification Search ............... 428/408; 423/445 R; 427/448; 252/70
See application file for complete search history.

(56) References Cited

U.S. PATENT DOCUMENTS

| | | | |
|---|---|---|---|
| 3,404,061 A | | 10/1968 | Shane et al. |
| 5,070,223 A | * | 12/1991 | Colasante ................... 219/759 |
| 5,709,740 A | | 1/1998 | Haider et al. |
| 6,391,442 B1 | * | 5/2002 | Duvall et al. ............... 428/348 |
| 6,746,768 B2 | | 6/2004 | Greinke et al. ............. 428/408 |
| 6,835,453 B2 | * | 12/2004 | Greenwood et al. ........ 428/343 |
| 2002/0016505 A1 | | 2/2002 | Gally et al. |
| 2002/0033247 A1 | * | 3/2002 | Neuschutz et al. ........... 165/10 |
| 2003/0151030 A1 | * | 8/2003 | Gurin ......................... 252/502 |
| 2004/0084658 A1 | | 5/2004 | Ottinger et al. |

FOREIGN PATENT DOCUMENTS

| | | |
|---|---|---|
| CA | 2 472 278 A1 | 7/2003 |
| DE | 196 30 073 A1 | 1/1998 |
| DE | 102 00 318 A1 | 7/2003 |
| EP | 1 416 027 A1 | 5/2004 |

OTHER PUBLICATIONS

Jun Fukai et al.: "Thermal conductivity enhancement of energy storage media using carbon fibers", *Energy Conversion & Management*, No. 41, 2000, pp. 1543-1556.
Min Xiao et al.: "Preparation and performance of shape stabilized phase change thermal storage materials with high thermal conductivity", *Energy Conversion and Management*, vol. 43, 2002, pp. 103-108.

* cited by examiner

*Primary Examiner*—Jennifer McNeil
*Assistant Examiner*—Daniel Miller
(74) *Attorney, Agent, or Firm*—Laurence A. Greenberg; Werner H. Stemer; Ralph E. Locher

(57) ABSTRACT

A latent heat storage material is in the form of a composite material formed of a phase-change material to store latent heat and graphite flakes incorporated therein to improve thermal conductivity. The graphite flakes are distinguished by a high aspect ratio and a high anisotropy of thermal conductivity. The volume content of graphite flakes in the latent heat storage material is between 10 and 40%. The composite material can be obtained by mixing the components or infiltrating a bed containing graphite flakes with a liquid phase-change material. The graphite flakes are preferably aligned during mixing with the phase-change material by shaking or tamping, etc., so that the thermal conductivity in the direction that is advantageous for the individual application is maximized. A latent heat storage unit containing the material and processes for producing the material and the unit and processes for using the material, are also provided.

23 Claims, No Drawings

US 7,235,301 B2

LATENT HEAT STORAGE MATERIAL, LATENT HEAT STORAGE UNIT CONTAINING THE MATERIAL, PROCESSES FOR PRODUCING THE MATERIAL AND THE UNIT AND PROCESSES FOR USING THE MATERIAL

BACKGROUND OF THE INVENTION

Field of the Invention

The invention relates to a latent heat storage material in the form of a composite material formed of at least one phase-change material in which flake-like graphite particles formed of natural graphite or synthetic graphite having a high aspect ratio and high anisotropy of thermal conductivity are incorporated in order to increase thermal conductivity. The invention also relates to a latent heat storage unit containing the material and to processes for the production and use thereof.

Phase-change materials are suitable for storing heat energy in the form of latent heat. Phase-change materials are understood to be materials that undergo a phase transition when heat is supplied or removed, e.g. a transition from the solid to the liquid phase (melting) or from the liquid to the solid phase (solidification) or a transition between a low-temperature and high-temperature modification. If heat is supplied to or removed from a phase-change material, its temperature upon reaching the phase transition point remains constant until the material is completely transformed. The heat supplied or removed during the phase transition, which causes no temperature change in the material, is known as latent heat.

The low thermal conductivity of those materials is disadvantageous to the practical application of phase-change materials as heat storage units. As a consequence, charging and discharging of the heat storage units is a relatively slow process.

The charging and discharging time for latent heat storage units can be reduced if the phase-change material is incorporated into a matrix formed of a material having high thermal conductivity. For example, German Published, Non-Prosecuted Patent Application DE 196 30 073 A1, corresponding to Australian Patent Application 39 41 197 A, proposed that a porous matrix formed of graphite be impregnated in vacuo with a "solid-liquid" phase-change material in the liquid phase. Impregnation can be performed through the use of immersion, vacuum or vacuum-pressure processes.

U.S. Patent Application Publication No. U.S.2002/0016505 A1 proposed adding an auxiliary agent having a high thermal conductivity to the phase-change material, for example metal or graphite powder. In particular, in Example 2 of that disclosure it is stated that 2 g of the phase-change material didodecyl ammonium chloride are ground together with 2 g of synthetic graphite KS6 and press-molded to form a molded article. The advantages of that procedure reside in variable molding through the use of cost-effective, industrially applicable molding processes, e.g. granulation or extrusion, and the possibility of processing solid phase-change materials and phase-change materials with solid additives, e.g. nucleating agents. Alternatively, use as a bed in a latent heat storage container provided with heat exchanger profiles is possible.

In contrast to the graphite matrix of German Published, Non-Prosecuted Patent Application DE 196 30 073 A1, corresponding to Australian Patent Application 39 41 197 A, which is impregnated with the phase-change material, in the mixtures described in U.S. Patent Application Publication No. U.S. 2002/0016505 A1, the particles of the heat-conducting auxiliary agent do not form a conductive framework incorporating the phase-change material. In the latter case the thermal conductivity is thus necessarily lower. A considerable disadvantage in the use of metal chips or synthetic graphite powder as heat-conducting admixtures lies in the fact that relatively high proportions of the heat-conducting auxiliary agent are needed for a significant increase in the thermal conductivity of the latent heat storage material (see the example above from U.S. Patent Application Publication No. U.S. 2002/0016505 A1). The energy density of the latent heat storage unit is reduced as a consequence.

The production of latent heat storage units from composite materials formed of phase-change materials that pass from the solid to the liquid phase upon changing phase, such as e.g. paraffin, a styrene-butadiene-styrene copolymer encapsulating the phase-change material and thus stabilizing it in its form and a small proportion of expanded graphite as heat-conducting auxiliary agent, is known from a publication by Min Xiao et al., entitled Energy Conversion and Management, Volume 43 (2002) pages 103 to 108. The composition of the composite material was given as follows: 80 parts by mass of paraffin, 20 parts by mass of copolymer and 3 to 5 parts by mass of expanded graphite. The actual proportion by mass of the heat-storing material is therefore only just under 80%. The dimensionally stabilizing material contributes little to heat conduction and nothing to latent heat storage.

Latent heat storage materials with the addition of expanded graphite as a heat-conducting auxiliary agent are known from European Patent Application EP 1 416 027 A1, corresponding to U.S. Patent Application Publication No. U.S. 2004/0084658 A1.

It was established that even with relatively small volume contents (5% or more) of expanded graphite, a significant increase in thermal conductivity is obtained. The addition of a dimensionally stabilizing material was not necessary. The advantages of that latent heat storage material with an addition of expanded graphite in comparison to a latent heat storage material which has an equal volume content of synthetic graphite, can be attributed to the special features of the nature, structure and morphology of the expanded graphite.

The crystal structure of the expanded graphite corresponds much more closely to the ideal graphite layer plane structure than the structure in the more isotropic particles of most synthetic graphites. That is why the thermal conductivity of the expanded graphite is higher.

Other characteristics of the expanded graphite are the low bulk density and high aspect ratio of the particles. As is known, for particles with a low packing density and high aspect ratio, the percolation threshold, i.e. the critical volume content of those particles in a composite material for the formation of continuous conductivity paths, is lower than for more densely packed particles having a lower aspect ratio and the same chemical composition. The conductivity is thus significantly increased by even relatively small volume contents of expanded graphite.

Molded articles can be produced from the latent heat storage material through the use of extrusion, injection molding or press-molding methods. Alternatively, a loosely packed bed of the latent heat storage material can be introduced into a container provided with heat exchanger profiles for the purposes of heat storage.

The production of expanded graphite and products made from expanded graphite is known, inter alia, from U.S. Pat. No. 3,404,061. Graphite intercalation compounds or graphite salts, e.g. graphite hydrogen sulfate or graphite nitrate, are heated rapidly in order to produce expanded graphite. The expanded graphite that is produced in that way is formed of relatively bulky, worm-shaped or concertina-shaped aggregates. The bulk density of expanded graphite ranges from 2 to 20 g/l, preferably from 2 to 7 g/l. As a result of the bulkiness of the particles and the low bulk density, the conveying and metering of particles of expanded graphite and the incorporation of expanded graphite into latent heat storage materials present some technical difficulties. Furthermore, the cost of producing expanded graphite, due to the large number of process steps that are needed and the use of energy and chemicals, is relatively high.

SUMMARY OF THE INVENTION

It is accordingly an object of the invention to provide a latent heat storage material, a latent heat storage unit containing the material, processes for producing the material and the unit and processes for using the material, which overcome the hereinafore-mentioned disadvantages of the heretofore-known products and processes of this general type and in which the latent heat storage material has a heat-conducting auxiliary agent that has advantageous properties similar to those of expanded graphite but not its disadvantages during production and processing.

With the foregoing and other objects in view there is provided, in accordance with the invention, a latent heat storage material. The latent heat storage material comprises a phase-change material having incorporated particles of graphite. At least a part of the graphite is made up of flakes having a high anisotropy of thermal conductivity and a high aspect ratio and being formed of at least one material selected from the group consisting of natural graphite and anisotropic synthetic graphite.

Thus the object of the invention is achieved by forming the latent heat storage material as a composite material formed of a phase-change material containing incorporated graphite as a heat-storing auxiliary agent. The graphite acting as the heat-conducting auxiliary agent contains flakes of natural graphite or/and a synthetic graphite having a high anisotropy of thermal conductivity and a high aspect ratio.

Other features, details and advantages of the invention emerge from the following detailed description of the invention and the embodiment examples.

In accordance with the present invention a composite material having a higher thermal conductivity than the pure phase-change material is obtained by adding a graphite material to the phase-change material as a heat-conducting auxiliary agent which contains particles having a layer plane structure which is very close to the ideal crystal lattice structure of graphite. The ideal graphite structure is formed of layer planes lying in parallel and equidistantly on top of one another with a hexagonal configuration of the carbon atoms. Only weak bonding forces act between the individual layer planes. As a result of this anisotropic structure of the graphite, numerous properties of this material are direction-dependent, for example the thermal and electrical conductivity in the layer planes is substantially higher than it is in the direction perpendicular to the layer planes. In accordance with another feature of the invention, in the graphites that are used as the heat-conducting auxiliary agent, the thermal conductivities in the various crystallographic directions differ by a factor of at least 50.

The graphite that is suitable for the present invention is formed of crystallites that are aligned with one another and are formed of individual layer planes with hexagonally disposed carbon atoms. These crystallites are in the form of flat platelets, scales or flakes. The term flakes is used below for the purposes of generalization. In accordance with a further feature of the invention, the average particle diameter of the graphite flakes that are suitable for the present invention is at least 30 µm and preferably no more than 3 mm.

In accordance with an added feature of the invention, such flake-like particles display a high aspect ratio, i.e. their extent in the particle plane (length or diameter) is substantially greater than their extent perpendicular to the particle plane (thickness). The aspect ratio of a graphite flake is the quotient of the length or diameter and thickness. Typical values lie in the range of from 10:1 to 100:1. As a comparison: the aspect ratio of a spherical particle is 1, since its extent is the same in all spatial directions.

As a result of the anisotropic structure, the thermal conductivity in the flakes is greater in the direction with the larger particle extent, in other words in the flake plane, than in the direction with the smaller particle extent.

Natural graphites in particular display a marked layer plane structure and orientation of the crystallites. The special properties vary, however, between the individual geological deposits. In the case of synthetic graphites produced by graphitization of carbon materials obtained by liquid-phase or solid-phase pyrolysis, the anisotropy is usually less strongly pronounced, and the shape of the particles is closer to the spherical form. However, there are also some types of synthetic graphite which display a marked anisotropy, e.g. TIMREX SFG from Timcal Ltd. (Bodio, Switzerland).

The alignment of the graphite particles is also retained in composite materials containing such graphite particles, with a suitable processing mode, so that the anisotropy of the graphite can be utilized in the use of the corresponding composite material. In the present invention the composite materials are formed of graphite particles and phase-change materials, which should have a high thermal conductivity in the desired direction of heat transfer. This can be achieved by aligning the graphite flakes when mixing them with the phase-change material by shaking, tamping or other suitable measures, so that the thermal conductivity in the direction that is favorable for the individual application is maximized.

In accordance with an additional feature of the invention, the thermal conductivity of the latent heat storage material in one spatial direction is preferably at least twice as high as that in a perpendicular spatial direction.

A further deciding criterion for the choice of suitable graphite materials is the bulk density. On one hand, the bulk density should not be as low as in expanded graphite, in order to avoid the problems in conveying, metering, processing and incorporating the graphite material that are associated with a low bulk density. On the other hand, in a graphite with a low bulk density a larger proportion of pores and cavities is available in which the phase-change material can be incorporated, allowing composite materials having a higher volume content of phase-change material to be produced. In accordance with yet another feature of the invention, natural graphites and anisotropic synthetic graphites having a bulk density of between 250 g/l and 700 g/l are suitable.

In accordance with yet a further feature of the invention, the volume-related graphite content in the composite materials according to the invention formed of phase-change material and anisotropic graphite, is 10 to 40%, preferably 15 to 30%. In the case of composite materials having a phase-change material that passes to the liquid phase upon changing phase, the composition of the composite material is preferably conformed to the bulk density of the graphite that is used. This means that the volume content of pores and cavities in the graphite in the form of a loosely packed bed is determined from a comparison between the bulk density and the theoretical density of the graphite (2.25 g/cm$^3$), and then a volume content of phase-change material is added that is calculated so that the pores and cavities are almost completely filled. With a composition adjusted in this way, separation processes, in particular settling of the graphite, when the phase-change material is in the liquid state, can be largely avoided. If the graphite content is lower, the liquid phase-change material and the graphite separate and the graphite particles settle on the bottom of the vessel. The higher the graphite content, the higher the viscosity of the mixture.

With the objects of the invention in view, there is also provided a process for the production of a latent heat storage material. The process comprises mixing components of the latent heat storage material with a mixer, an extruder or a kneader. The intimate mixing of phase-change material and graphite is achieved by using suitable mixing methods, for example stirring, mixing in a powder mixer, kneading or granulation.

With the objects of the invention in view, there is additionally provided a process for the production of a latent heat storage material. The process comprises producing the latent heat storage material by producing, in a vessel, a bed of graphite containing graphite flakes, covering the bed with a layer of liquid phase-change material, infiltrating the bed with the liquid phase-change material, and solidifying the phase-change material.

Phase-change materials having a solid-liquid phase transition are preferably mixed in the liquid state with the flake-containing graphite, for example by stirring the graphite into the liquid phase-change material or by infiltration of the liquid phase-change material into a graphite bed containing graphite flakes. Infiltration can be supported by vacuum or pressure. The possibility of producing the composite material formed of graphite and phase-change material by infiltration of the phase-change material into a loosely packed bed of graphite is a decisive advantage of the present invention in comparison to the use of expanded graphite. As a result of the very low bulk density it is technically extremely difficult to infiltrate loosely packed beds of expanded graphite with a liquid, because high foaming occurs and the expanded particles float. Moreover, the mechanical stability of particles of expanded graphite is so low that when a bed is covered with a layer of the liquid phase-change material prior to infiltration, both the structure of the bed and the individual particles are destroyed.

In order to be able to infiltrate expanded graphite with a liquid phase-change material, it must first be pre-compressed. It is known from German Published, Non-Prosecuted Patent Application DE 196 30 073 A1, corresponding to Australian Patent Application 39 41 197 A, for example, that a porous matrix formed of expanded graphite must be pre-compressed to a density of at least 75 g/l for impregnation with a phase-change material in the liquid phase.

The composite materials formed of graphite and phase-change materials according to the invention can be particularly advantageously produced through the use of compounding processes known from plastics technology for the production of compounds, e.g. kneading or granulation. Compounding through the use of an extruder, for example a twin-screw extruder, is particularly preferred. The advantage of this process lies in the fact that the phase-change material is melted. A greater homogeneity can be achieved than in a powder mixing process through the continuous incorporation of the graphite into the liquid phase.

In comparison to the use known from the prior art of expanded graphite as the heat-conducting auxiliary agent for phase-change materials, the problems associated with conveying, metering, processing and incorporating materials having a low bulk density are avoided with the present invention. A further substantial advantage of the present invention lies in the fact that natural graphite can be used directly. By contrast, in order to produce expanded graphite from natural graphite, graphite salts must first be produced by treatment with concentrated acids and then expanded by exposure to high temperatures. The present invention enables the chemicals and heat energy needed for the production of expanded graphite to be saved, so that the latent heat storage material obtained is not only less expensive but also displays a more advantageous ecological balance.

In accordance with yet an added feature of the invention, mixtures containing graphite flakes and expanded graphite are added to the phase-change material as the heat-conducting auxiliary agent. By choosing the ratio of graphite flakes to expanded graphite, the person skilled in the art can specifically adjust the bulk density of the graphite in order to achieve as high a thermal conductivity as possible combined with the lowest possible graphite content in the latent heat storage material and the best possible processability of the graphite blend.

In accordance with yet an added feature of the invention, all phase-change materials that are inert with respect to graphite in the working temperature range can be used in the latent heat storage materials according to the invention. The process according to the invention for the production of latent heat storage units allows the use of various types of phase-change materials. The phase change can reside both in a transition between the liquid and solid phase and in a transition between various solid phases. The phase transition temperatures of the phase-change materials that are suitable for the latent heat storage material according to the invention are in the range from −100° C. to +500° C. At phase transition temperatures above 500° C., increased care must therefore be taken to protect the graphite against oxidative attack from ambient oxygen.

In accordance with yet an added feature of the invention, suitable phase-change materials are, for example, paraffins, sugar alcohols, gas hydrates, water, aqueous solutions of salts, salt hydrates, mixtures of salt hydrates, salts (particularly chlorides and nitrates) and eutectic blends of salts, alkali metal hydroxides and mixtures of several of the aforementioned phase-change materials, for example mixtures of salts and alkali metal hydroxides or of paraffins and salt hydrates. Typical salt hydrates that are suitable as a phase-change material are calcium chloride hexahydrate and sodium acetate trihydrate.

The choice of phase-change material is made according to the temperature range in which the latent heat storage unit is used.

In accordance with yet an additional feature of the invention, auxiliary substances, e.g. nucleating agents, are added to the phase-change material if necessary, in order to prevent supercooling during the solidification process. The volume content of nucleating agent in the latent heat storage material should not exceed 2%, since the volume content of nucleating agent is at the expense of the volume content of heat-storing phase-change material. Nucleating agents that significantly reduce supercooling of the phase-change material even in a low concentration are therefore needed. Suitable nucleating agents are substances that display a similar crystal structure and a similar melting point to the phase-change material that is used, for example tetrasodium diphosphate decahydrate for the phase-change material sodium acetate trihydrate.

With the objects of the invention in view, there is furthermore provided a latent heat storage unit, comprising the latent heat storage material having a form selected from the group consisting of a loosely packed bed and free-flowing granules.

In accordance with yet another feature of the invention, the latent heat storage materials can be used as a bed or as a molded article. Various molding processes known inter alia from plastics technology are suitable for producing molded articles containing the latent heat storage material according to the invention, for example press-molding, extrusion and injection molding. A high anisotropy of thermal conductivity is typical of these molded articles, since the graphite flakes orient themselves perpendicularly to the press-molding direction or parallel to the injection or extrusion direction. The molded articles are used either directly as heat storage units or as a component of a heat storage device.

In a press-molded sheet made from the heat storage material according to the invention, the thermal conductivity parallel to the sheet plane is therefore higher than it is perpendicular to the sheet plane. The same applies to injection-molded sheets if the injection point or injection points are located on one or more edges of the sheet. If, however, a molded article is to be produced in which the thermal conductivity perpendicular to the plane is greater than that in the plane, this can be achieved by cutting the article from a block of the latent heat storage material in which the graphite flakes are aligned, so that the cut surface and hence the plane of the cut-off article runs perpendicular to the orientation of the graphite flakes in the block. For example, the desired article can be sawn or sliced from a press-molded block of the latent heat storage material of appropriate dimensions perpendicular to the press-molding direction or from an extruded strand of appropriate dimensions perpendicular to the extrusion direction. A block in which the graphite flakes are aligned can also be produced by infiltrating a bed containing graphite flakes, in which the flakes have been aligned by shaking, with a liquid phase-change material and then allowing this to solidify. Articles can likewise be cut from a block of this type in such a way that the cut plane is perpendicular to the orientation of the graphite flakes.

The anisotropy of thermal conductivity can be utilized in the structural layout of the latent heat storage unit by preferably arranging the molded article made from the latent heat storage material in such a way that the extent with the higher thermal conductivity lies in the direction of the desired heat transfer. In other words, it is oriented towards a heat exchanger profile or an object having a temperature to be controlled.

In the case of applications in which this is not feasible, a bed formed of the latent heat storage material according to the invention can alternatively be used, which is introduced into an environmentally isolated container provided with heat exchanger profiles. According to this variant of the heat storage unit, the latent heat storage material is provided as a powdered mixture or as free-flowing granules.

In accordance with another mode of the invention, if the phase-change material is in the liquid state, the flake-like graphite particles can be disposed in such a bed by tamping or shaking so that they are substantially horizontal.

With the objects of the invention in view, there is also provided a process for the production of a latent heat storage unit. The process comprises providing the latent heat storage material in the latent heat storage unit by providing a heat storage container having heat exchanger tubes running in a vertical direction and having a space between the tubes, introducing a graphite bed containing graphite flakes into the space between the tubes, orienting the graphite flakes by shaking or tamping, covering the graphite bed with a layer of a liquid phase-change material, and infiltrating the graphite bed with the phase-change material.

If vertical heat exchanger tubes are passed through a bed with graphite flakes oriented in this way, the graphite flakes oriented perpendicular to the heat exchanger tubes, i.e. directed away from the tubes, allow an effective supply of the heat from the heat exchanger tubes into the interior of the heat storage material or an effective removal of the heat from the interior of the heat storage material to the tubes. Such a horizontal configuration in the bed can be achieved more easily with the flake-like particles of the anisotropic graphite used according to the invention than with the bulky particles of expanded graphite.

In accordance with a further mode of the invention, the latent heat storage material can also be produced directly in the container by filling it with a bed of flake-like graphite, aligning the graphite flakes horizontally by shaking or tamping and then infiltrating them with the liquid phase-change material, wherein the infiltration can be supported with pressure or vacuum. With expanded graphite as the heat-conducting auxiliary agent, this method would not be usable because of the difficulties involved in infiltrating a bed of expanded graphite, as already described.

With the objects of the invention in view, there is concomitantly provided a process for using the latent heat storage materials according to the invention in latent heat storage units, for example for the temperature control and air conditioning of rooms, buildings and motor vehicles, for example for the transport of heat-sensitive goods, for cooling electronic components or for storing heat, in particular solar energy or process heat produced in industrial processes.

Other features which are considered as characteristic for the invention are set forth in the appended claims.

Although the invention is described herein as embodied in a latent heat storage material, a latent heat storage unit containing the material, processes for producing the material and the unit and processes for using the material, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

EXAMPLE 1

In order to produce composite materials formed of graphite and phase-change material in which the volume-related graphite content corresponds to the volume fraction of the particular graphite in the graphite bed, the following procedure was used: First of all the bulk density or compacted bulk density of the graphite to be used was determined. A bed of the graphite was then produced in a beaker. The graphite flakes were substantially oriented horizontally therein. The graphite bed was then covered with a layer of the liquid phase-change material. The phase-change material was metered in that case in such a way that its volume content corresponded to the pore volume in the graphite bed. Under the influence of gravity the phase-change material flowed into the pores in the graphite bed and filled them. This process can be made easier or accelerated by evacuation (vacuum infiltration), the application of an external gas pressure (pressure infiltration) or a combination of both procedures (vacuum-pressure infiltration). Following solidification of the phase-change material a solid composite is formed, which can be removed from the beaker after partial melting of the surface, e.g. in a water bath.

As a consequence of the orientation of the graphite flakes, the composite formed of graphite and phase-change material displays a higher thermal conductivity in the direction that was horizontal during infiltration ("horizontal thermal conductivity") than perpendicular to that direction ("vertical thermal conductivity"). The orientation and the volume content of the graphite in the heat storage material can be additionally increased by shaking the graphite bed before infiltration.

Latent heat storage composites were produced using this procedure from the graphites listed in Table 1 and the phase-change material paraffin RT54 (from the firm Rubitherm, Germany), which displays a solidification point of 54° C. Samples were taken from the cooled graphite-paraffin composites, on which the horizontal thermal conductivity with the paraffin in the solidified state was determined.

As a result of the differing bulk densities or compacted bulk densities, the composite materials produced in this way display diverging graphite contents. In order to nevertheless be able to compare the heat-conducting properties of the various composites, the thermal conductivity was divided by the volume fraction of graphite in the composite. This value characterizes the effectiveness of the type of graphite used in each case in terms of the increase in thermal conductivity achieved. The results are summarized in Table 2. It was found that based on the volume content in the paraffin-graphite composite, natural graphites or anisotropic synthetic graphites result in a significantly higher increase in the thermal conductivity of the composite than isotropic synthetic graphites.

TABLE 1

| Product name | Manufacturer | Graphite type | Average particle diameter $(d_{50})/[\mu m]$ |
| --- | --- | --- | --- |
| Stratmin 5098 | Timcal Ltd., Switzerland | Natural graphite | 385 |
| TFL 898 | Graphit Kropfmühl AG, Germany | Natural graphite | 230 |
| Luoyang 599 | Luoyang Guangi Ind. & Trade Co., China | Natural graphite | 395 |
| SFG 150 | Timcal Ltd., Switzerland | Anisotropic synthetic graphite | 55 |
| KS 6 | Timcal Ltd., Switzerland | Isotropic synthetic graphite | 3.3 |
| KS 150 | Timcal Ltd., Switzerland | Isotropic synthetic graphite | 50 |

TABLE 1-continued

| Product name | Manufacturer | Graphite type | Average particle diameter $(d_{50})/[\mu m]$ |
| --- | --- | --- | --- |
| Graphitized coke | SGL Carbon Group | Isotropic synthetic graphite | 1000 |

TABLE 2

| Composite | Graphite content/ [vol. %] | Thermal conductivity/ [W/(m · K)] | Effectiveness/ [W/(m · K · vol. %)] |
| --- | --- | --- | --- |
| Stratmin 5098/RT54 | 28 | 8.4 | 0.30 |
| TFL 898/RT54 | 21 | 6.6 | 0.31 |
| Luoyang 599/RT54 | 30 | 11.5 | 0.39 |
| SFG 150/RT54 | 11 | 2.7 | 0.24 |
| KS 6/RT54 | 7.5 | 1.0 | 0.13 |
| KS 150/RT54 | 24 | 4.4 | 0.18 |
| Graphitized coke/RT54 | 36 | 4.2 | 0.12 |

EXAMPLE 2

Composites formed of the phase-change material paraffin RT54 and natural graphite (TFL 898) and isotropic synthetic graphite (KS150), respectively, with approximately the same graphite content, were produced by the method described in Example 1. The horizontal thermal conductivity was determined when the paraffin had solidified. Despite the somewhat lower graphite content, the composite with natural graphite displayed a substantially higher thermal conductivity than the comparative sample with isotropic synthetic graphite (see Table 3).

TABLE 3

| Composite | Graphite content/ [vol. %] | Thermal conductivity/ [W/(m · K)] |
| --- | --- | --- |
| TFL 898/RT54 | 21 | 6.6 |
| KS 150/RT54 | 24 | 4.4 |

EXAMPLE 3

In order to investigate the influence of the phase-change material on the thermal conductivity of the composite, composite materials formed of natural graphite TFL 898 and the phase-change materials RT54 (from the firm Rubitherm, Germany) or sodium acetate trihydrate (NaAc*$3H_2O$, from the firm Silbermann, Germany) were produced by the method described in Example 1. The horizontal thermal conductivities of the composite materials and of the pure phase-change materials are shown in Table 4. The higher thermal conductivity of the pure NaAc*$3H_2O$ in comparison to the pure RT54 also leads to a higher conductivity in the NaAc*$3H_2O$-graphite composite.

TABLE 4

| Composite | Graphite content/ [vol. %] | Thermal conductivity/ [W/(m · K)] |
| --- | --- | --- |
| TFL 898/RT54 | 21 | 6.6 |
| RT54 | 0 | 0.2 |

TABLE 4-continued

| Composite | Graphite content/ [vol. %] | Thermal conductivity/ [W/(m · K)] |
|---|---|---|
| TFL 898/NaAc*3H₂O | 21 | 7.7 |
| NaAc*3H₂O | 0 | 0.6 |

EXAMPLE 4

Table 5 shows the horizontal thermal conductivity of composites formed of natural graphite (TFL 898) and the paraffin RT54 with various graphite contents. The composites were produced in the same way as in Example 1. A higher graphite content leads to a higher thermal conductivity.

TABLE 5

| Composite | Graphite content [vol. %] | Thermal conductivity/ [W/(m · K)] |
|---|---|---|
| TFL 898/RT54 | 21 | 6.6 |
| TFL 898/RT54 | 28 | 10.7 |

EXAMPLE 5

In order to investigate the anisotropy of thermal conductivity in graphite-containing latent heat storage materials, composites were produced from the phase-change material paraffin RT54 and natural graphites (Stratmin 5098, Luoyang 599) and isotropic synthetic graphite (KS 150), respectively, by the method described in Example 1. In order to improve the orientation of the flakes, the bed of Luoyang 599 was shaken before infiltration with paraffin. The thermal conductivity in the horizontal and vertical direction was measured in all composite materials. The anisotropy factor A was determined from the quotient of these two values. The results are summarized in Table 6. The composites with natural graphite as the heat-conducting auxiliary agent display significantly higher thermal conductivities in the horizontal direction and anisotropy factors than the composite containing isotropic synthetic graphite. The comparison between the two composite materials containing natural graphite shows that the composite with horizontally oriented graphite particles displays a lower vertical thermal conductivity on one hand but a substantially higher horizontal thermal conductivity on the other hand. This leads to a markedly higher anisotropy factor.

TABLE 6

| Composite | Graphite content [vol. %] | Thermal conductivity/ [W/(m · K)] | | A [-] |
|---|---|---|---|---|
| | | Horizontal | Vertical | |
| Stratmin 5098/RT54 | 28 | 8.4 | 3.8 | 2.2 |
| Luoyang 599/RT54 | 30 | 11.5 | 2.5 | 4.6 |
| KS 150/RT54 | 24 | 4.4 | 2.9 | 1.5 |

This application claims the priority, under 35 U.S.C. § 119, of European Patent Application 04 011 756.6, filed May 18, 2004; the entire disclosure of the prior application is herewith incorporated by reference.

We claim:

1. A latent heat storage material, comprising:
 a phase-change material having incorporated particles of graphite;
 at least a part of said graphite being made up of flakes having a high anisotropy of thermal conductivity and a high aspect ratio and being formed of at least one material selected from the group consisting of natural graphite and anisotropic synthetic graphite, said graphite flakes having a volume content in the latent heat storage material of between 10 and 40%.

2. The latent heat storage material according to claim 1, wherein said thermal conductivity of said graphite particles in various crystallographic directions differs by a factor of at least 50.

3. The latent heat storage material according to claim 1, wherein said aspect ratio of said graphite flakes is at least 1:10.

4. The latent heat storage material according to claim 1, wherein said graphite flakes have an average particle diameter $d_{50}$ of at least 30 μm.

5. The latent heat storage material according to claim 1, wherein said graphite flakes have a bulk density of between 250 g/l and 700 g/l.

6. The latent heat storage material according to claim 1, wherein said thermal conductivity of the latent heat storage material in one spatial direction is at least twice as high as said thermal conductivity in a perpendicular spatial direction.

7. The latent heat storage material according to claim 1, wherein particles of expanded graphite and said graphite flakes are incorporated in said phase-change material.

8. The latent heat storage material according to claim 1, wherein said phase-change material is at least one phase-change material having a melting point in a range of from −100° C. to 500° C. and being selected from the group consisting of paraffins, sugar alcohols, gas hydrates, water, aqueous solutions of salts, salt hydrates, mixtures of salt hydrates, salts and eutectic blends of salts, alkali metal hydroxides and mixtures of several of said aforementioned phase-change materials.

9. The latent heat storage material according to claim 1, wherein said phase-change material is sodium acetate trihydrate.

10. the latent heat storage material according to claim 1, wherein said phase-change material is calcium chloride hexahydrate.

11. the latent heat storage material according to claim 1, which further comprises at least one nucleating agent.

12. A latent heat storage unit, comprising:
 a latent heat storage material according to claim 1;
 said latent heat storage material having a form selected from the group consisting of a loosely packed bed and free-flowing granules.

13. A latent heat storage unit, comprising:
 a molded article containing the latent heat storage material according to claim 1.

14. A process for the production of a latent heat storage material, which comprises the following steps:
 providing a device selected from the group consisting of a mixer, an extruder and a kneader; and
 mixing components of the latent heat storage material according to claim 1 with the device.

15. A process for the production of a latent heat storage material, which comprises producing the latent heat storage material according to claim 1 by the following steps:

producing, in a vessel, a bed of graphite containing graphite flakes;

covering the bed with a layer of liquid phase-change material;

infiltrating the bed with the liquid phase-change material; and solidfying the phase-change material.

16. The porcess according to claim 15, which further comprises applying a vacuum or overpressure during the infiltrating step.

17. A process for the production of a latent heat storage material, which comprises:

orienting the graphite flakes of the latent heat storage material according to claim 1 by shaking or tamping.

18. A process for the production of a latent heat storage unit, which comprises providing the latent heat storage material according to claim 1 in the latent heat storage unit by the following steps:

providing a heat storage container having heat exchanger tubes running in a vertical direction and having a space between the tubes;

introducing a graphite bed containing graphite flakes into the space between the tubes;

orienting the graphite flakes by shaking or tamping;

covering the graphite bed with a layer of a liquid phase-change material; and infiltrating the graphite bed with the phase-change material.

19. The process according to claim 18, which further comprises applying a vacuum or overpressure during the infiltrating step.

20. A process for the production of a latent heat storage unit, which comprises producing a molded article from the latent heat storage material according to claim 1 by a process selected from the group consisting of injection molding, extrusion and press-molding.

21. A process for the production of a latent heat storage unit, which comprises:

producing a block of the latent heat storage material according to claim 1 in which the graphite flakes have an orientation; and cutting an article from the block along a cutting plane perpendicular to the orientation of the graphite flakes.

22. A process for temperature and air conditioning control, which comprises:

controlling temperature and air conditioning of rooms, buildings and motor vehicles for the transport of heat-sensitive goods, with the latent heat storage material according to claim 1.

23. a process for cooling or storing heat or energy, which comprises:

cooling electronic components or storing heat, solar energy or process heat produced in industrial processes, with the latent heat storage material according to claim 1.

* * * * *